J. M. ROBERTS.
ELECTRIC TELEGRAPH MESSENGER CALL RECORDER.
APPLICATION FILED DEC. 15, 1914.

1,174,181.

Patented Mar. 7, 1916.
2 SHEETS—SHEET 1.

Jacob M. Roberts, Inventor

Witnesses

J. M. ROBERTS.
ELECTRIC TELEGRAPH MESSENGER CALL RECORDER.
APPLICATION FILED DEC. 15, 1914.
1,174,181.
Patented Mar. 7, 1916.
2 SHEETS—SHEET 2.
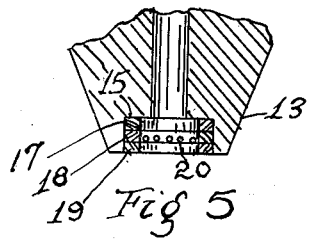
Fig 5
Fig 7
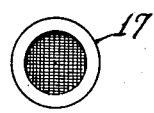
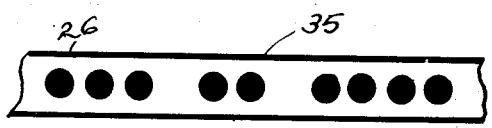
Fig 6
Fig 8
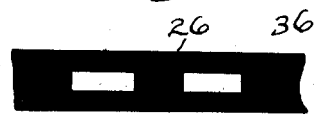
Fig 9
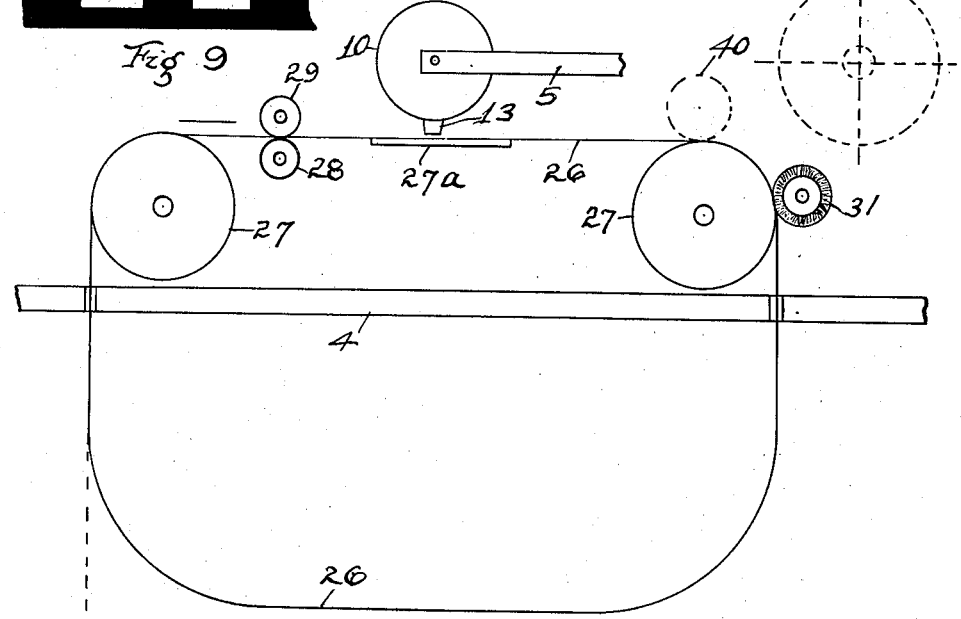
Fig 10
Jacob M. Roberts, Inventor

UNITED STATES PATENT OFFICE.

JACOB M. ROBERTS, OF NORFOLK, VIRGINIA.

ELECTRIC-TELEGRAPH MESSENGER-CALL RECORDER.

1,174,181. Specification of Letters Patent. Patented Mar. 7, 1916.

Application filed December 15, 1914. Serial No. 877,371.

*To all whom it may concern:*

Be it known that I, JACOB M. ROBERTS, a citizen of the United States, residing at Norfolk, in the county of Norfolk and State of Virginia, have invented certain new and useful Improvements in Electric-Telegraph Messenger-Call Recorders, of which the following is a specification.

My invention relates to messenger call recorders for telegraph systems.

The object of the invention is to provide means for recording signals without the use of ink or tape as is the customary practice.

Figure 1:
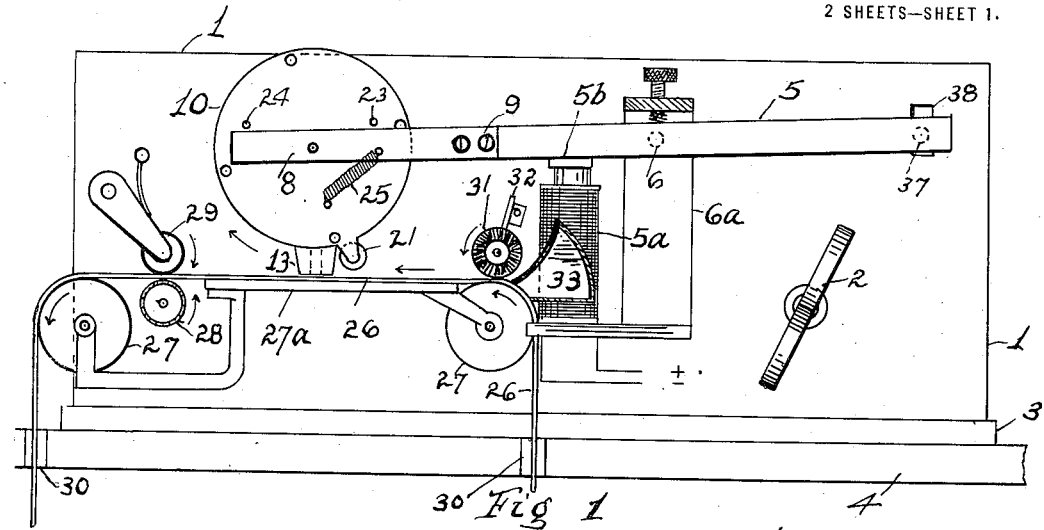
Figure 2:
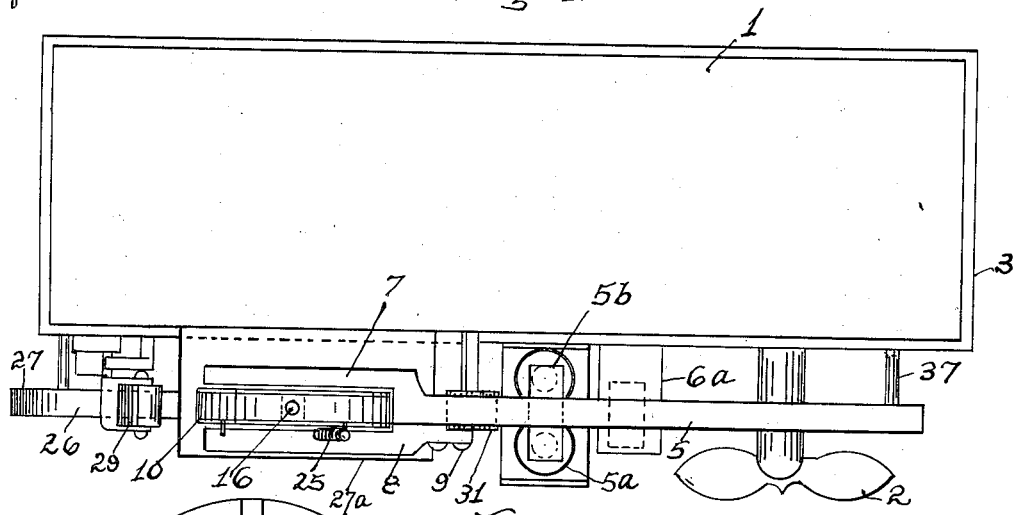
Figure 3:
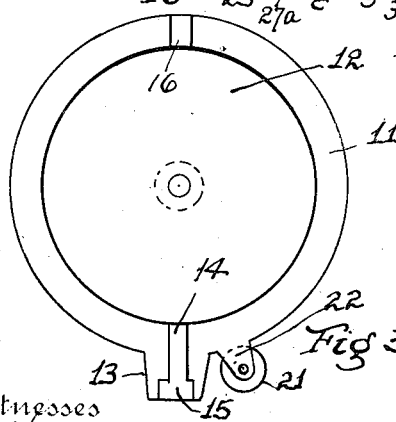
Figure 4:
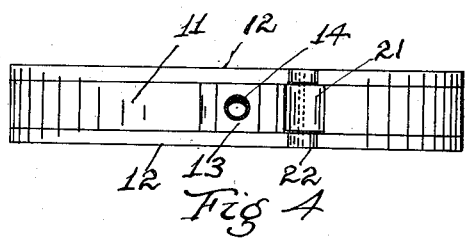

Further objects and advantages will be more fully described herein and specifically pointed out in the annexed claims recourse being had to the accompanying drawings forming a part of this specification in which:

Figure 1 is a side view of the apparatus embodying my invention. Fig. 2 is a plan of the same. Fig. 3 is a side view of the marking wheel with one of its plates or disks removed. Fig. 4 is a bottom plan of the same. Fig. 5 is a fragmentary portion of the marking wheel showing the marking point. Fig. 6 is a plan of the marking powder depositing ring and its dusting wire or textile gauze. Figs. 7, 8 and 9 are plan views of the signal receiving belt showing different kinds of signal marks, and Fig. 10 is a diagrammatic side view of my device showing the association of the different elements included in the construction of my apparatus.

In the drawings like reference numerals indicate similar parts in all the several views.

1 is the motor box or casing containing the mechanism necessary to operate the several parts of my invention, as will be described hereafter. The motor within the box 1 usually consists of a spring motor wound for action by the key 2. The motor box has a base 3 and generally rests upon an ordinary table 4.

5 is a spring pressed vibrating magnet lever pivoted at 6 in the yoke 6ª.

5ª is an electromagnet the electric excitation of which draws down the lever 5 by means of the iron armature 5ᵇ.

7 is an offset end of the lever 5 and taken with the removable part 8, forms a yoke for the marking wheel 10 so that the wheel may be removed at will. The two parts of the yoke all held together by means of the screws 9, as shown.

10 is the marking or registering wheel mounted on a suitable shaft for rotation in the yoke of the lever 5. The wheel is composed of a ring or annulus 11 and the plates or disks 12 forming a hollow box or receptacle.

13 is a projection or foot forming a marking dust outlet lug having the orifice 14 therethrough to the interior of the box. The orifice 14 is provided with an enlargement or counterbore 15 for the hereinafter described gauze rings.

16 is an orifice for filling the marking wheel with a suitable waterproof light colored dusting powder, preferably lycopodium, calcined magnesia, soapstone and the like, so that it may sift through the gauze, of various degrees of fineness, contained between the rings 17 and 19.

19 is a plain ring which forms a space between the other gauze rings for the agitator balls 20. The balls prevent the marking powder from packing between the gauzes.

When the electric current traverses the coils of the electromagnet 5ª, the lever 5 is pulled downward by the armature 5ᵇ with sufficient force to cause the projection 15 to strike a mark receiving belt passing over a table or bracket 27ª leaving upon it a thin deposit of a marking powder contained in the wheel 10 thus recording the signals received in dots or dashes. In this manner, the expense and inconvenience of ink and paper tape are eliminated. When the current ceases in the electromagnet, the lever 5 is restored to its normal position by suitable spring means.

21 is a roller mounted between the lugs or ears 22 on the disks 12 and is disposed very close to the dust outlet 13, as will be described hereafter.

23 and 24 are stop pins, the former preventing the wheel 10 from going too far forward or to the left, and the latter prevents it from having a too far movement in the opposite direction. The spring 25 allows the wheel to go to the left and restores it to its former position and the wheel is then against the stop pin 24.

26 is an endless belt which is black where a white record powder is used for the signals received. The belt passes over flanged pulleys 27 supported on the belt table or bracket 27ª. The movement of the belt is effected by the knurled wheel 28 receiving its motion from the motor in its box 1.

29 is a spring pressed pressure roller for holding the belt down upon the driving wheel or roller 28. When the part 13 of the wheel 10 has made a mark on the belt, the wheel moves a certain distance with the belt, therefore the roller 21 comes in contact with the belt allowing it to have a free movement and remains until released by the upward motion of the lever 5 when released by the electromagnet 5ª. The ends of the belt are usually passed through holes 30 in a table and then the ends cemented to form an endless belt of such length as to allow signals to be seen that have passed out of sight and is accomplished by simply pulling the belt from beneath the table in the same manner as where an ordinary paper tape is used. In order to keep the belt erased from marks for future signals or deposits of dust marks, I use a brush or erasing wheel or roller 31 operated from the motor and placed in the rear of the marking wheel 10 and about over the rear belt pulley, as shown. In this manner all marks made by the wheel 10 are removed making a clean surface for future signal marks.

In order to clear the brush wheel from particles of dust I place a cleaning plate 32 or a similar device which will sweep the dust into a receptacle 33 if it is found expedient to use such.

34 shows white powder dots and 36 white dashes, as may be desired, upon a black belt which I prefer to use as it is easier to erase a white powder therefrom than to erase a black powder from a light colored or white belt.

In cases where a record for a long period is desired I may use the ordinary white paper tape and use a black powder, (Fig. 8 at 35), the tape being taken from the reel 39, Fig. 10, passes under the feed roller 40 and then to some point where it accumulates for reference.

In the above case, the brush wheel 31 would be pulled out of contact or removed, as desired.

I may use a black paper tape with a white powder as in the case with the black endless belt as already described.

When the upward movement of the rear end of the lever 5 takes place, the motor mechanism in the casing 1 is started by the pin 37 working in the slot 38, Fig. 1, and controls the operation of the motor.

I claim:

1. A device of the class described comprising an electro-magnetically and spring controlled signal marking receptacle adapted to give a blow to deposit powder marks and having a progressive movement during the depressed position thereof, and a retracting movement when the wheel is restored to non-marking position by said spring, and a moving band or belt for receiving electric signal powder marks therefrom.

2. A device of the class described comprising a magnet controlled vibrating lever, a spring controlled and roller mounted wheel or receptacle thereon having a rotary forward and backward movement, a dust outlet thereon whereby signal marks are deposited, a motor operated signal receiving belt coacting with said wheel or receptacle, and a dust erasing brush wheel and dust receptacle for eliminating previous signal marks made on said belt.

In testimony whereof I have hereunto affixed my signature in the presence of two witnesses.

JACOB M. ROBERTS.

Witnesses:
 EVALYN S. ROMER,
 WALTER B. BURROW